(12) United States Patent
Spicer et al.

(10) Patent No.: US 9,618,410 B2
(45) Date of Patent: Apr. 11, 2017

(54) CLAMP FORCE AND ALIGNMENT CHECKING DEVICE

(71) Applicant: GM GLOBAL TECHNOLOGY OPERATIONS LLC, Detroit, MI (US)

(72) Inventors: John Patrick Spicer, Plymouth, MI (US); Wayne W. Cai, Troy, MI (US); Debejyo Chakraborty, Novi, MI (US); Keith Mink, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 299 days.

(21) Appl. No.: 14/566,130

(22) Filed: Dec. 10, 2014

(65) Prior Publication Data

US 2015/0165673 A1    Jun. 18, 2015

Related U.S. Application Data

(60) Provisional application No. 61/915,865, filed on Dec. 13, 2013.

(51) Int. Cl.
| | |
|---|---|
| *B32B 41/00* | (2006.01) |
| *G01L 5/16* | (2006.01) |
| *B23K 20/10* | (2006.01) |
| *B23K 31/12* | (2006.01) |
| *B23K 20/26* | (2006.01) |
| *G01L 5/00* | (2006.01) |
| *B23K 101/36* | (2006.01) |

(52) U.S. Cl.
CPC .............. *G01L 5/16* (2013.01); *B23K 20/10* (2013.01); *B23K 20/26* (2013.01); *B23K 31/12* (2013.01); *G01L 5/0038* (2013.01); *G01L 5/0085* (2013.01); *B23K 2201/36* (2013.01)

(58) Field of Classification Search
CPC ....... G01L 5/16; G01L 5/0085; G01L 5/0038; B23K 20/26; B23K 20/10; B23K 31/12; B23K 2201/36
USPC ....... 156/64, 350, 358, 367, 378, 379, 379.6
See application file for complete search history.

(56) References Cited

U.S. PATENT DOCUMENTS 5,795,431 A * 8/1998 Weissfloch .......... B29C 65/7894
156/304.6

FOREIGN PATENT DOCUMENTS

| CN | 1701943 A | 11/2005 |
|---|---|---|
| CN | 103028835 A | 4/2013 |
| CN | 103817427 A | 5/2014 |
| DE | 19614734 A1 | 10/1996 |

(Continued)

*Primary Examiner* — Michael N Orlando
*Assistant Examiner* — Joshel Rivera
(74) *Attorney, Agent, or Firm* — Quinn IP Law

(57) ABSTRACT

A check fixture measures a total clamp force applied by a welder device. The welder device includes a welding horn having a plurality of weld pads and welding anvil having a plurality of weld pads. The check fixture includes a base member operatively supporting a plurality of force sensors. The base member and the force sensors are received between the weld pads of the welding horn and the anvil pads of the welding anvil. Each force sensor is configured to measure an individual clamp force applied thereto by corresponding weld and anvil pads when the base member is received between the welding horn and the welding anvil and the welder device is in the clamped position. The individual clamp forces are used to determine whether the weld and/or anvil pads are worn or misaligned.

20 Claims, 5 Drawing Sheets

(56) References Cited

FOREIGN PATENT DOCUMENTS

| | | |
|---|---|---|
| EP | 0920977 A1 | 6/1999 |
| JP | H10113992 A | 5/1998 |
| JP | H1120024 A | 1/1999 |

* cited by examiner

CLAMP FORCE AND ALIGNMENT CHECKING DEVICE

CROSS-REFERENCE TO RELATED APPLICATIONS

This application claims the benefit of U.S. Provisional Application No. 61/915,865, filed on Dec. 13, 2013, which is hereby incorporated by reference in its entirety.

STATEMENT REGARDING FEDERALLY SPONSORED RESEARCH OR DEVELOPMENT

This invention was made with U.S. Government support under an Agreement/Project DE-EE0002217, Department of Energy American Recovery and Reinvestment Act (ARRA) of 2009, Battery Pack Manufacturing B511. The U.S. government may have certain rights in this invention.

TECHNICAL FIELD

The present disclosure relates to a clamp force and alignment checking device for monitoring of vibration welding equipment.

BACKGROUND

Vibration welding is a technique in which vibration energy is applied in a particular frequency range to a clamped work piece. The frequency range is typically ultrasonic. Surface friction between vibrating adjacent surfaces of the clamped work piece generates heat, which ultimately softens and bonds the adjacent surfaces of the work piece. Vibration welding in a well-controlled process, using properly functioning welding equipment, typically produces welds having a highly consistent and repeatable weld quality. However, while various approaches exist for ensuring control of a vibration welding process, such approaches may be less than optimal for the purposes of ongoing monitoring of a maintenance status or other status condition of the vibration welding equipment.

SUMMARY

One possible aspect of the disclosure provides a check fixture for measuring a total clamp force applied by a welder device. The welder device includes a welding horn and a welding anvil. The welding horn and welding anvil are movable between an unclamped position and a clamped position. The check fixture includes a base member and a plurality of force or pressure sensors. The base member has a first side and a second side, opposing the first side. The plurality of force sensors are operatively supported by the base member. The base member and the plurality of force sensors are configured to be received between the welding horn and the welding anvil with the welding horn facing the first side and the welding anvil facing the second side. Each of the plurality of force sensors is configured to measure an individual clamp force applied thereto by the welding horn and welding anvil when the base member is received between the welding horn and the welding anvil and the welder device is in the clamped position.

Another possible aspect of the disclosure provides a vibration welding system including a welder device and a check fixture. The welder device includes a welding horn and a welding anvil. The welder device is configured to apply a total clamp force to the check fixture clamped between the welding horn and the welding anvil. The welding horn includes a plurality of weld pads. The welding anvil includes a plurality of anvil pads disposed in facing relationship to the plurality of weld pads. The check fixture is configured to measure the total clamp force applied thereto by the welder device. The check fixture includes a base member and a plurality of force sensors. The base member has a first side and a second side, opposing the first side. The force sensors are each operatively supported by the base member. The base member and the force sensors are configured to be received between the weld pads of the welding horn and the anvil pads of the welding anvil with the welding horn facing the first side and the welding anvil facing the second side. As such, each of the weld pads and each of the anvil pads face a respective one of the force sensors. Each force sensor is configured to measure an individual clamp force applied thereto by the respective weld pad of the welding horn and the respective anvil pad of the welding anvil when the base member is received between the welding horn and the welding anvil and the welder device is clamped.

Yet another possible aspect of the disclosure provides a method for determining a status of a welder device. The welder device includes a welding horn having a plurality of weld pads and a welding anvil having a plurality of anvil pads. The method includes clamping a plurality of force sensors between a respective weld pad of the welding anvil and a respective anvil pad of the welding horn. A force signal from each of the force sensors is transmitted to a processor. Each of the force signals corresponds to a respective one of the force sensors being clamped between the respective weld pad of the welding horn and the respective anvil pad of the welding anvil. The force signals from each of the force sensors are received in the processor. The force signals are processed in the processor to determine an individual clamp force corresponding to each of the force sensors to thereby determine a status condition of the weld and anvil pads of the vibration welding equipment.

The above features and advantages and other features and advantages of the present teachings are readily apparent from the following detailed description of the best modes for carrying out the present teachings when taken in connection with the accompanying drawings.

DETAILED DESCRIPTION

Figure 1:
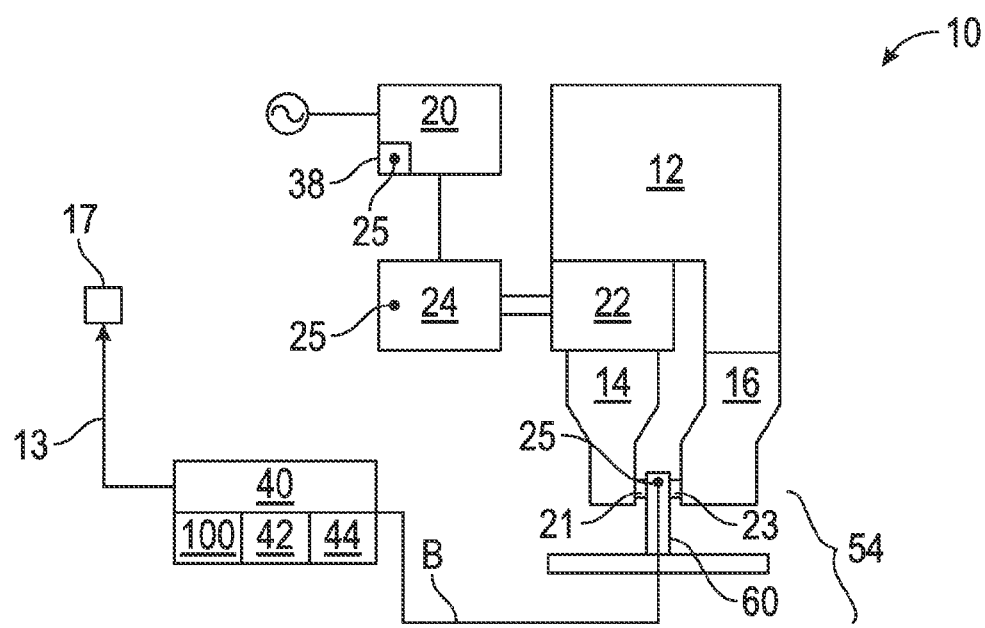
FIG. 1 is a schematic illustration of an example suite of vibration welding equipment which may be monitored as set forth herein.

Referring to the drawings, wherein like reference numbers refer to like components throughout the several Figures, a suite of vibration welding equipment 10 is shown schematically in FIG. 1. The vibration welding equipment 10 may be used, for instance, to form welds in the fabrication of a work piece, with an example work piece 130 shown in FIG. 2 in the form of a portion of a multi-cell battery pack. While other types of work pieces may be ultrasonically welded without departing from the intended inventive scope, the example work piece 130 of FIG. 2 is typical of the type of welded system in which high-quality/durable welds must be formed in a repeatable process.

Figure 2:
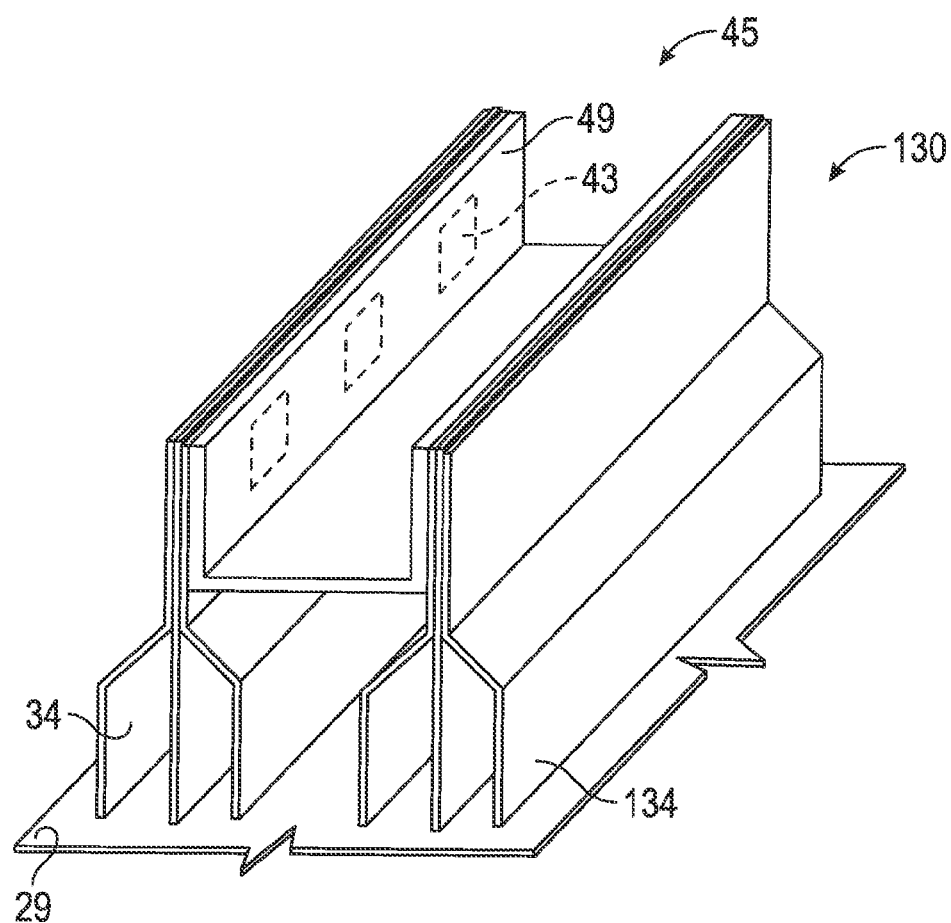
FIG. 2 is a schematic perspective view of an example work piece in the form of a multi-cell battery module which may be welded using the vibration welding equipment shown in FIG. 1.
Figure 7:
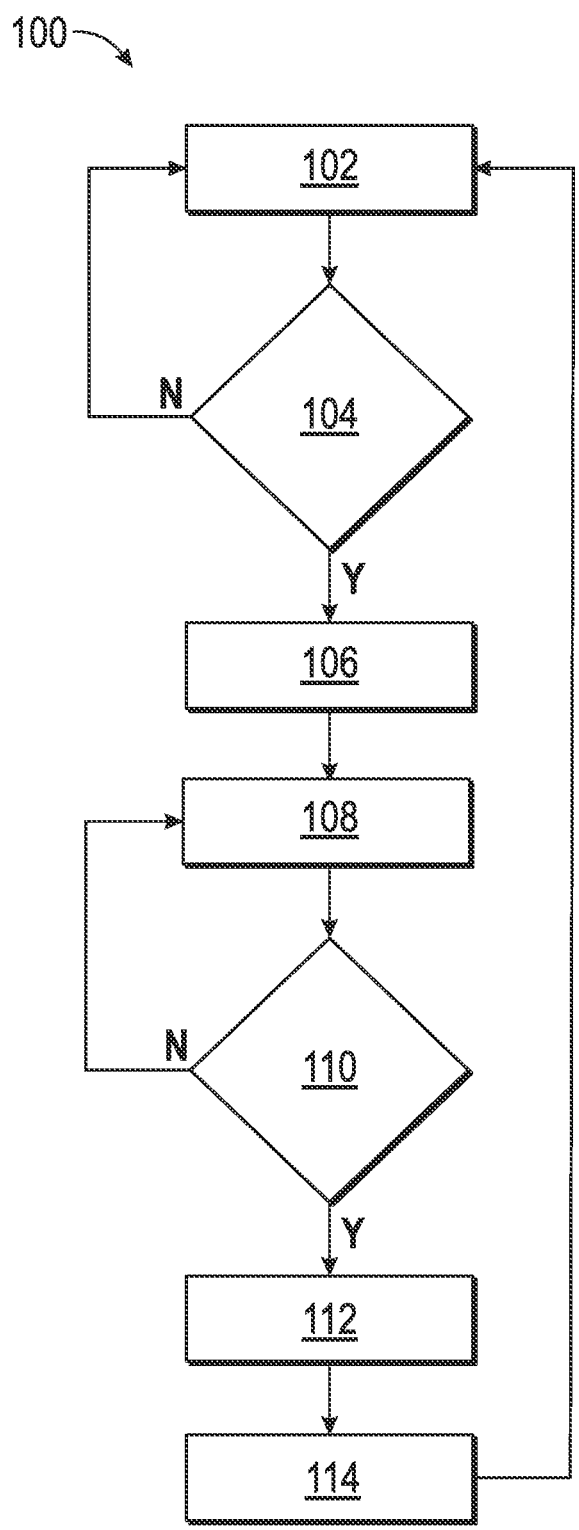
FIG. 7 is a flow chart describing an example method for checking the clamping force and alignment of the welding equipment using the check station.

Referring now to FIGS. 1 and 2, a host device 40 is in communication with the vibration welding equipment 10 and sensors 25 positioned with respect to the vibration welding equipment 10. Each sensor 25 has a different function, with a set of example sensors 25B-H shown in FIG. 3. The host device 40, i.e., a computer, also includes a processor 42 and tangible, non-transitory memory 44 on which is recorded instructions embodying the present method 100, an example of which is shown in FIG. 7. The host device 40 periodically executes the instructions via the processor 42 to thereby monitor a maintenance status or other status condition of the vibration welding equipment 10. As part of this process, the vibration welding equipment 10 may be tested at a nearby check station 54, with such testing described in further detail below with reference to FIGS. 3-5.

The example vibration welding equipment 10 of FIG. 1 may include a welder device 12 having a sonotrode/welding horn 14 and a welding anvil 16, with the welder device 12 providing a backing structure and support for the welding horn 14 and the welding anvil 16. The vibration welding equipment 10 may also include a welding controller 20. The welding horn 14 is typically connected to a transducer 24, for instance a piezoelectric stack. Signals from the welding controller 20 cause the transducer 24 to vibrate at a calibrated frequency, which in turn vibrates the welding horn 14 at that same frequency, possibly amplified by a booster 22.

As will be understood by those of ordinary skill in the art, a welding controller/power supply of the type used for vibration welding, such as the welding controller 20 of FIG. 1, may be electrically-connected to a suitable energy source, typically a 50-60 Hz wall socket. The welding controller 20 may include, for example, an oscillator or timer 38, as well as voltage rectifiers, transformers, power inverters, and/or other hardware which ultimately transforms the source power, whatever its form, into vibration control signals. The control signals ultimately command predetermined waveform characteristic(s), for example a periodic signal having a frequency of about 20 kHz to about 40 kHz or more depending on the particular welding application.

The welding horn 14 shown in FIG. 1 typically includes a plurality of weld pads 21, each having a textured knurl pattern, e.g., bumps and/or ridges, which are suitable for gripping and holding a work piece clamped between the welding horn 14 and the welding anvil 16. Each weld pad 21 corresponds to a weld 43, illustrated in FIG. 2. Two or more welds are typically formed at a time. Each anvil pad 23 of the welding anvil 16, illustrated in FIG. 2, typically includes a similar knurl pattern and is disposed in opposing relationship to a weld pad 21 of the welding horn 14. The vibration welding equipment 10 may also include a booster 22, i.e., a mechanical amplifier, which increases the amplitude of any commanded mechanical vibration from the transducer 24, as needed.

Figure 3:
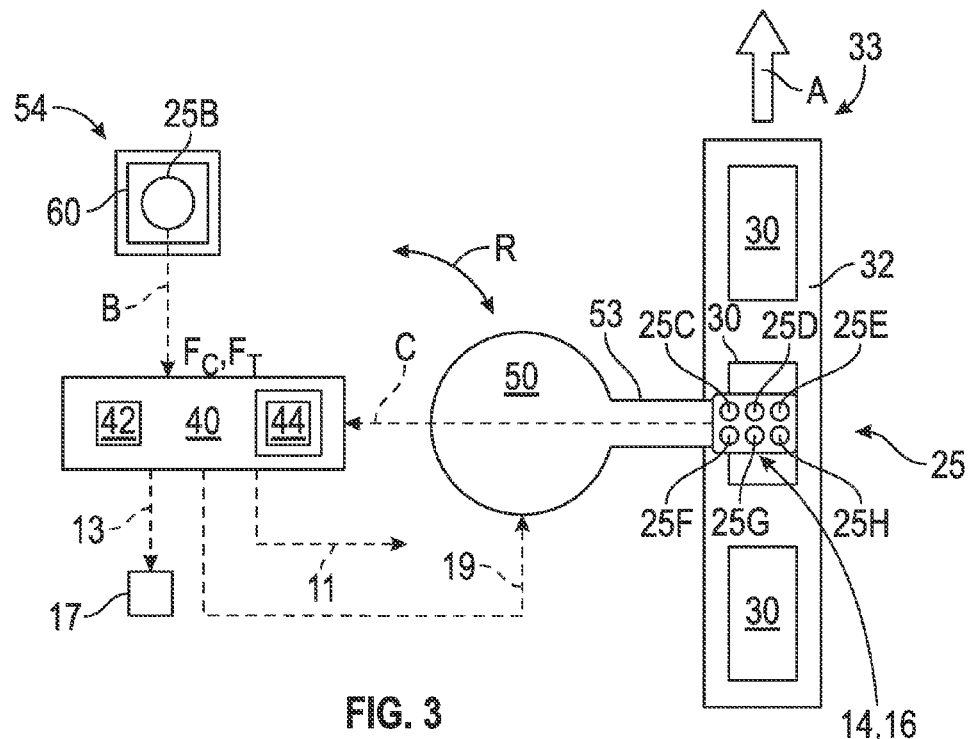
FIG. 3 is a schematic illustration of a system for monitoring a condition of the vibration welding equipment shown in FIG. 1.

The host device 40 of FIG. 3 receives signals from each of the sensors 25 and then processes the received signals in the execution of the method 100. The sensors 25 may be configured to measure forces, amplitude, displacement, acoustics, temperatures, a weld pad attitude, and the like. The host device 40 may also transmit an acoustic test signal (arrow 11) as part of the method 100, and also may output a control signal (arrow 13) to an external device 17, e.g., a quality indicator. Some of these signals are force signals, e.g., individual clamp forces Fc and total clamp forces Ft, received from a force sensor 25B, which are received from the check station 54 (arrow B), as described below with reference to FIGS. 3-5. Further, the host device 40, may transmit a control signal (arrow 19) to the robot 50 of FIG. 3 to command proper alignment of the weld head 21 for each weld and/or other positioning of the robot 50 and/or for process monitoring.

The host device 40 of FIGS. 1 and 3 may include, as noted above, the processor 42 and memory 44. The memory 44 may include any required read only memory (ROM), flash, optical, and/or other non-transitory memory. The host device 40 may also include transitory memory, e.g., any required random access memory (RAM), electrically-programmable read-only memory (EPROM), etc. The host device 40 may also include additional circuitry such as a high-speed clock (not shown), analog-to-digital circuitry, digital-to-analog circuitry, a digital signal processor, and the necessary input/output devices and other signal conditioning and/or buffer circuitry. The host device 40 thus provides the necessary hardware components needed to execute process instructions embodying the present method 100.

Referring to FIG. 2, in a non-limiting example embodiment, a work piece 130 is shown as a portion of a multi-cell battery having an elongated conductive interconnecting member 45. A full battery module may include an extended series of interconnecting members 45 arranged side-by-side in multiple rows. Each interconnecting member 45 joins oppositely-charged battery cell tabs 34, 134, of adjacent battery cells, with the battery cell tabs 34, 134 forming individual electrode extensions of a given battery cell. Each battery cell tab 34, 134 is internally-welded, below an interconnect board 29 to the various anodes or cathodes comprising that particular battery cell, as is well understood by those of ordinary skill in the art. The battery cell tabs 34, 134 may be welded using the vibration welding equipment 10 of FIG. 1 to a longitudinal side wall 49 of a given interconnecting member 45, with substantially identical welds 43 formed at each interconnecting member 45.

Referring to FIG. 3, in an example vibration welding process 33, the vibration welding equipment 10 of FIG. 1 may be used to form welds on a set of work pieces 30 as the work pieces 30 move along a conveyor 32 in the direction of arrow A. A welding robot 50 may move between the conveyor 32 and the check station 54 as indicated by arrow R. Some components of the vibration welding equipment 10 of FIG. 1 may be disposed on an arm 53 of the robot 50, including at least the welding horn 14 and welding anvil 16 described above. In normal operation, the robot 50 can be used to form welds on the work pieces 30 as the work pieces 30 move on the conveyor 32, or alternatively as the robot 50 moves with respect to the work pieces 30. Periodically, e.g., once per shift or once per a calibrated number of welds, the robot 50 may rotate toward the check station 54 and perform certain condition monitoring steps to determine the status condition of the welder device 12, including the measurement of a total clamp force Ft and individual clamp forces Fc, applied by the weld pads 21 and anvil pads 23 to the check station. The measured clamp forces Fc are then transmitted as signals B to the host device 40 of FIG. 1, where the signals B are stored in the memory 44.

Figure 4:
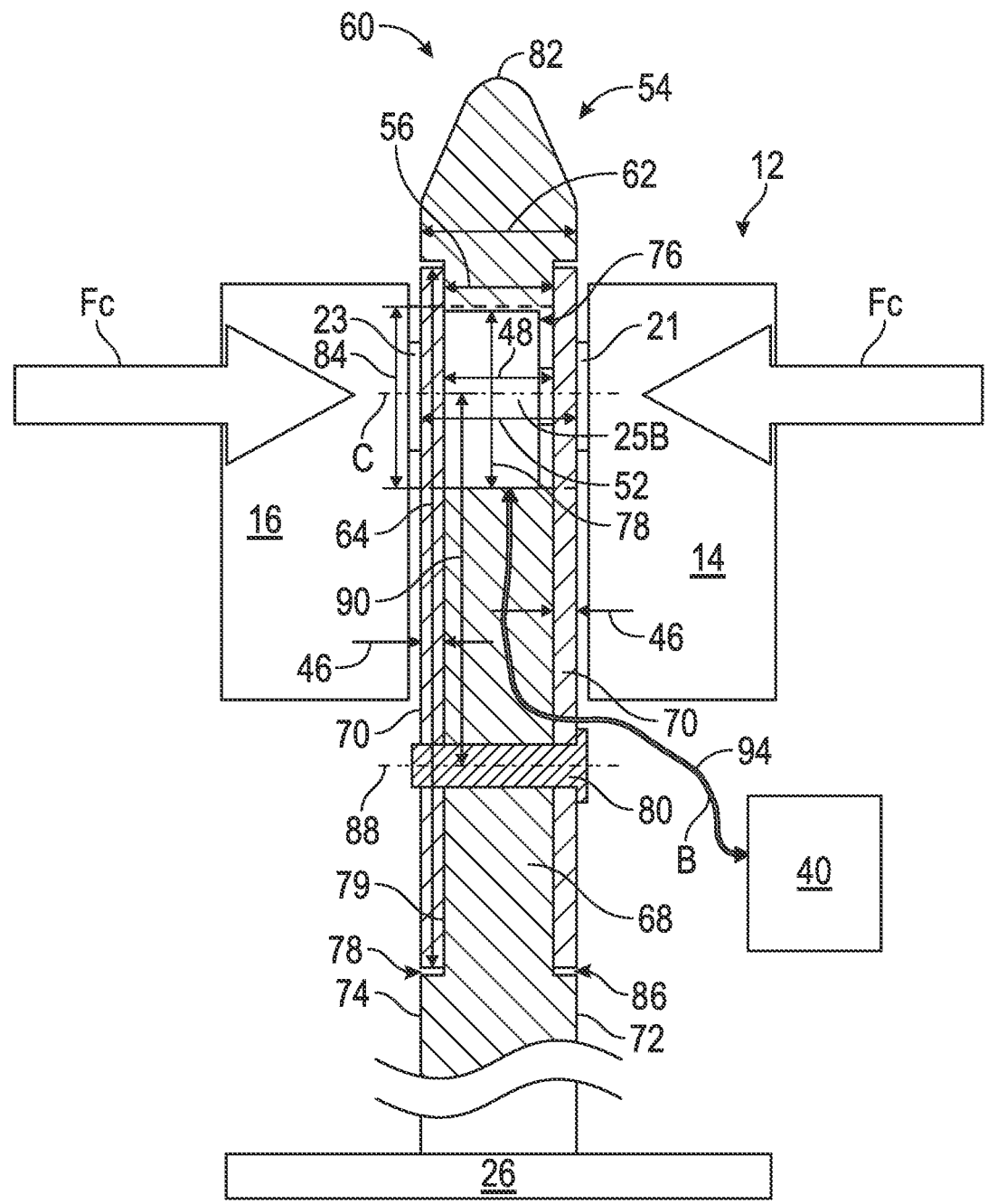
FIG. 4 is a schematic illustration of a partial cross-sectional side view of a check station taken along line 4-4 of FIG. 5, which may be used to measure a clamp force of a welder device of the vibration welding equipment shown in FIG. 1.

Referring to FIG. 4, the check station 54 includes a check fixture 60 having a plurality of force sensors 25B, each corresponding to a respective weld pad 21 of the welding horn 14. Therefore, if there are three weld pads 21 on the welding horn 14, then there would need to be three force sensors 25B on the check fixture 60. To test the clamp force Ft, Fc, the welding horn 14 and welding anvil 16 of the welder device 12 are applied to the check fixture 60 with the welding horn 14 and welding anvil 16 in an unclamped position, i.e., the welding horn 14 and welding anvil 16 are not applying a clamp force Ft, Fc. Once applied to the check fixture 60, the welder device 12 is activated such that the welding horn 14 and welding anvil 16 move toward one another to a clamped position, i.e., the welding horn 14 and welding anvil 16 are applying the clamp force Ft, Fc to the check fixture 60. The force sensors 25B may be force transducers, such as compression force sensors, and the like. More specifically, the force sensors 25B are configured to convert an input mechanical force into an electrical output signal (arrow B). As such, the force sensors 25B are configured for measuring the individual clamp force Fc and/or the total clamp force Ft applied by the weld pads 21, 23 of the welding horn 14 and welding anvil 16. Ultimately, a determination is made as to whether the total clamp force Ft is within an acceptable range. More specifically the total clamp force Ft is a total of individual clamp forces Fc applied by the welding horn 14 and welding anvil 16. Each individual clamp force Fc corresponds to a respective weld pad 21 of the welding horn 14. Therefore, two force sensors 25B will result in the output of force signals B for two individual clamps forces Fc being transmitted to the host device 40. The total or sum of these two individual clamp forces Fc is the total clamp force Ft applied by the welding horn 14 and welding anvil 16 to the check fixture 60. The force sensors 25B should be selected so as to prevent inadvertently being over compressed, and thus damaged, during testing of the welder device 12 on the check fixture 60. Therefore, each force sensor 25B needs to be selected to withstand the individual clamp force Fc that may be applied by the respective weld pad 21 and anvil pad 23 during the testing process.

Alignment of the welding horn 14 relative to the welding anvil 16 can also be determined as a function of the relative difference(s) between the individual clamp forces Fc between each weld pad 21 and the corresponding force sensor 25B. An imbalance in the total clamp force Ft is signified if the relative difference(s) between the individual clamp forces Fc is beyond a defined threshold. Relative difference(s) beyond a defined threshold may be indicative of a misalignment between the welding horn 14 and welding anvil 16, requiring the orientation of the welding horn 14 and the welding anvil 16 be realigned relative to one another. Therefore, if there are two force sensors 25B and the difference between the two respective individual clamp forces Fc is greater than the defined threshold, a misalignment between the weld pads 21 and the anvil pad 23 is identified, requiring correction. Failure to correct the alignment between the weld pads 21 and anvil pad 23 may result in non-uniform welds across the workpiece 130.

Referring now to FIG. 4, the check fixture 60 is configured for measuring the total clamp force Ft applied by clamping the welding anvil 14 and the welding horn 16 to the check fixture 60. The check fixture 60 includes a base member 68 and the plurality of the force sensors 25B. The base member 68 includes a first side 72 and a second side 74, opposing the first side 72. The base member 68 has a base thickness 62 defined between the first and second sides 72, 74, thin enough to fit between the weld and anvil pads 21, 23 of the welding horn 14 and welding anvil 16 when applying the welder device 12 to the check fixture 60. By way of a non-limiting example, the base thickness 62 may be less than 6 millimeters.

Figure 5:
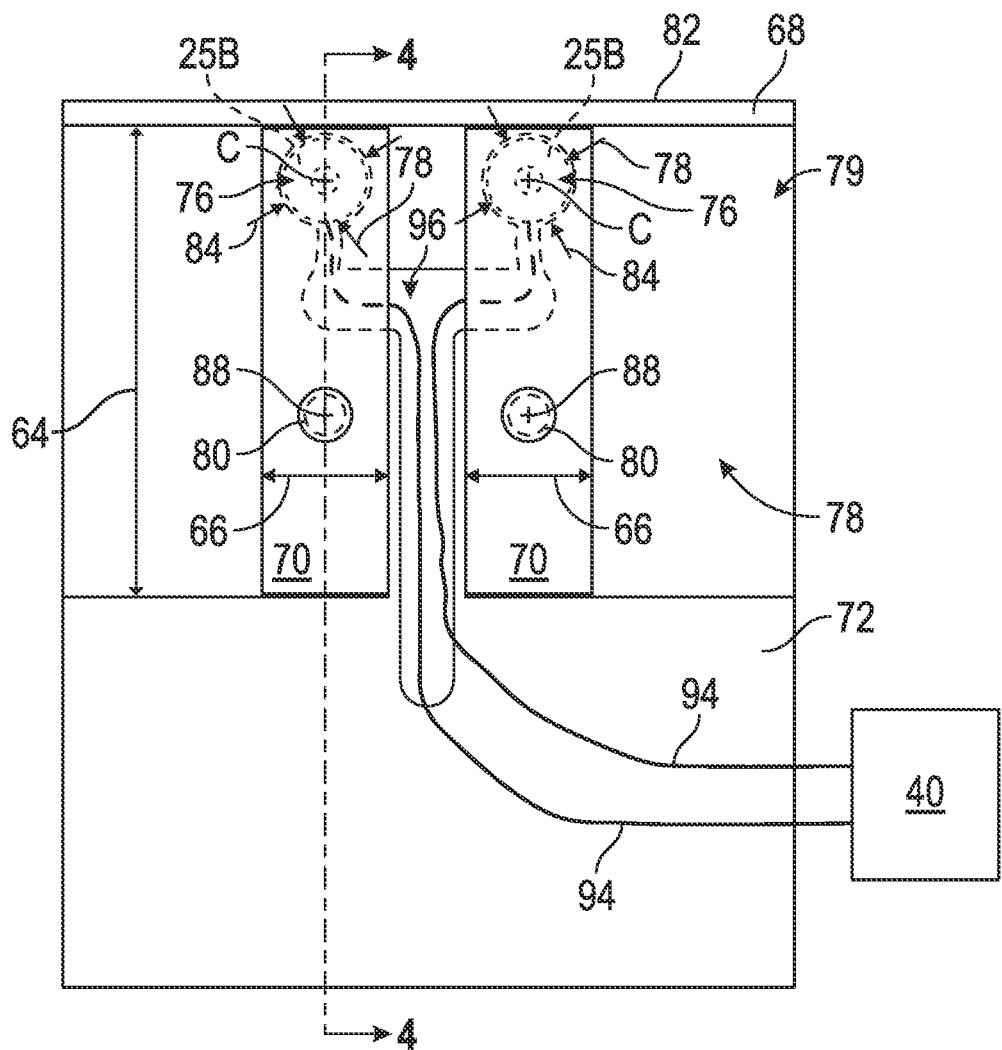
FIG. 5 is a schematic side view of the check station of FIG. 4.

A plurality of openings 76 are defined in the base member 68, between the sides 72, 74. The location of each opening 76 is configured to correspond to the location of the respective weld and anvil pads 21, 23 of the welding horn 14 and welding anvil 16, when the welder device 12 is applied to the fixture 60. The force sensors 25B are disposed in a respective opening 76 such that the base member 68 supports the force sensors 25B. Referring to FIGS. 4 and 5, the opening 76 may be sized to have a first diameter 84 and the force sensors 25B may be sized to have a second diameter 78 that is less than the first diameter 84. This difference between the second diameter 78 and the first diameter 84 allows the force sensors 25B to float within the openings 76 and compensate for any small misalignments between the welder device 12 and the check fixture 60. It should be appreciated that while force sensors 25B and openings 76 shown and described herein are round, force sensors 25B and openings 76 having other shapes may also be used, as known to those of skill in the art. As already described above, each force sensor 25B is configured to measure the individual clamp force Fc between the pads 21, 23 of the welding horn 14 and welding anvil 16.

Referring to FIG. 4, the base member 68 extends to a ridge 82. The ridge 82 may be generally rounded in shape so that the ridge 82 acts to guide the welding horn 14 and welding anvil 16 into the proper locations on opposite sides 72, 74 of the base member 68 as the welder device 12 is applied to the check fixture 60. As such, the base member 68, tapers from the first and second sides 72, 74, to converge at the ridge 82.

The plates 70 are operatively attached to each side 72, 74 of the base member 68 to cover and protect the force sensors 25B from being damaged through contact with the knurls of the weld and anvil pads 21, 23. The plates 70 may be formed from hardened steel to capture and protect the force sensors 25B. It should be appreciated that the plates 70 may also be made of any other suitable material. The first side 72 and the second side 74 of the base member 68 each define a recess 86 that extends to a respective floor 79. Each recess 86 is sized to receive a number of plates 70 corresponding to the number of force sensors 25B and the plates 70 are inserted into the recess 86 such that the plates 70 are disposed therein, along the floor 79 to cover the respective openings 76. Therefore, if there are two force sensors 25B, there are two plates 70 disposed in the recess 86 defined in the first side 72 and two plates 70 disposed in the recess 86 defined in the second side 74.

Referring specifically to FIG. 5, each plate 70 has a length 64 and a width 66. The length 64 and width 66 are sized to cover the respective opening 76. This allows the plates 70 to completely cover the respective opening 76, thus protecting the force sensors 25B from damage by the pads 21, 23. The plates 70 are attached to the base member 68 such that the force sensors 25B are sandwiched between a corresponding pair of plates 70. Each plate 70 is attached to the base member 68 at a fastening location 88, spaced a distance 90 from a center C of the respective opening 76. The fastening location 88 may be positioned such that the respective opening 76 is defined between the ridge 82 and the fastening location 88. The distance 90 is configured such that the plate 70 is cantilevered relative to the fastening location 88 and transfers the individual clamp force Fc from the weld pad 21 and anvil pad 23 to the respective force sensor 25B. The plates 70 are attached to the base member 68 via a fastener 80 and the like. Once attached to the base member 68, the plates 70 may be substantially flush with the respective side 72, 74 of the base member 68, as shown in FIGS. 4 and 5.

Referring again to FIG. 4, each plate has a plate thickness 46 and each load sensor 25B has a length 48. In order to provide additional accuracy in the measurements of the individual clamp forces Fc, the total of the plate thicknesses 46 of two corresponding plates 70 and the corresponding load sensor 25B should be selected to be a desired total thickness 52.

Further, with continued reference to FIG. 4, a span 56 is defined between the floors 79 of the opposing sides 72, 74 of the base member 68. The length of the load sensor 25B should be sized to be slightly larger than the span 56. This difference in size allows for a compression to take place as the load sensor 25B is sandwiched between the welding horn 14 and welding anvil 16, when the welder device 12 is in the clamped position.

In use, when the welder device 12 is applied to the check fixture 60, the welding horn 14 and welding anvil 16 clamp onto the plates 70 of the check fixture 60 such that the each of the weld pads 21, 23 of the welding horn 14 and welding anvil 16 contact a corresponding plate 70, while being aligned with a respective force sensor 25B. As such, the welding horn 14 and welding anvil 16 apply the individual clamp forces Fc to the respective force sensors 25B, via the respective plates 70, as illustrated in FIG. 4.

Referring again to FIGS. 4 and 5, the check station 54 includes the host device 40 in electrical communication with each of the force sensors 25B. The host device 40 may be attached to the force sensors 25B via wires 94, as shown in FIGS. 4 and 5. Alternatively, the force sensors 25B may be wirelessly connected to the host device 40, e.g., via Bluetooth, WiFi, and the like. The host device 40 is configured to collect data related to the total clamp force Ft and individual clamp forces Fc when the welder device 12 is applied to the check fixture 60 and in the clamped position. The host device 40 may collect the force data Ft, Fc to determine if the forces Ft, Fc are within acceptable limits. More specifically, the data may be stored for the individual clamp forces Fc, as well as the total clamp force Ft. The limits, i.e., upper and lower limits, may be set for each force sensor 25B.

Monitoring each load sell 25B individually helps to ensure the weld pressure applied at each weld pad 21 is correct. Additionally, determining the total clamp force Ft allows for the diagnosis of at least three different issues within the welding equipment 10. A determination that the total clamp force Ft is too low or too high may indicate an issue with the air pressure that is supplied to the welder device 12, e.g., an air leak, the setting for air pressure is too high or too low, and the like. If the total clamp force Ft is slightly low or slightly high, it may be possible to adjust the air pressure automatically to re-target the total clamp force Ft to a target value. However, if the total clamp force Ft is too far out of the desired range, then a maintenance person should be alerted to correct the pressure of the system 10, if the system is activated based on pneumatics. Further, the host device 40 may be configured to determine the amount of misalignment between the welding horn 14 and welding anvil 16. A determination that the total clamp force Ft is in an acceptable range, yet a difference between the individual clamp forces Fc of different weld pads 21 is too high may signify a misalignment between the welding horn 14 and welding anvil 16. If a misalignment is detected, the welding process must be stopped until the welding horn 14 and welding anvil 16 are realigned with one another. Individual force sensors 25B that have too much or too little clamp force Fc being applied thereto could be indicative of tool wear issues, e.g., one of the weld pads 21 or a portion of the welding pads 21, 23 is more worn than at another location 21, 23. If a detection of uneven wear of the weld pads 21, 23 is made, the welding horn 14 and/or welding anvil should be replaced or repaired. The system 10 may alert a maintenance person to perform this operation.

Referring again to FIG. 5, the first side 72 may define at least one channel 96 that opens to each opening 76. A portion of each wire 94 is routed along the first side 72 of the base member 68 to provide protection to the wires 94. Each wire 94 extends from the respective force sensor 25B, out of the opening 76, and is routed along the channel 96. Therefore, at least a portion of the wires 94 may be sandwiched between the respective plate 70 and a portion of the channel 96 defined in the floor 79 of the recess 86.

Referring again to FIG. 4, the check fixture 60 may be operatively disposed on a table 26 configured to swivel. Such a table may be spring-loaded to facilitate automatic alignment of the check fixture 60 with respect to the welder device 12.

Figure 6:
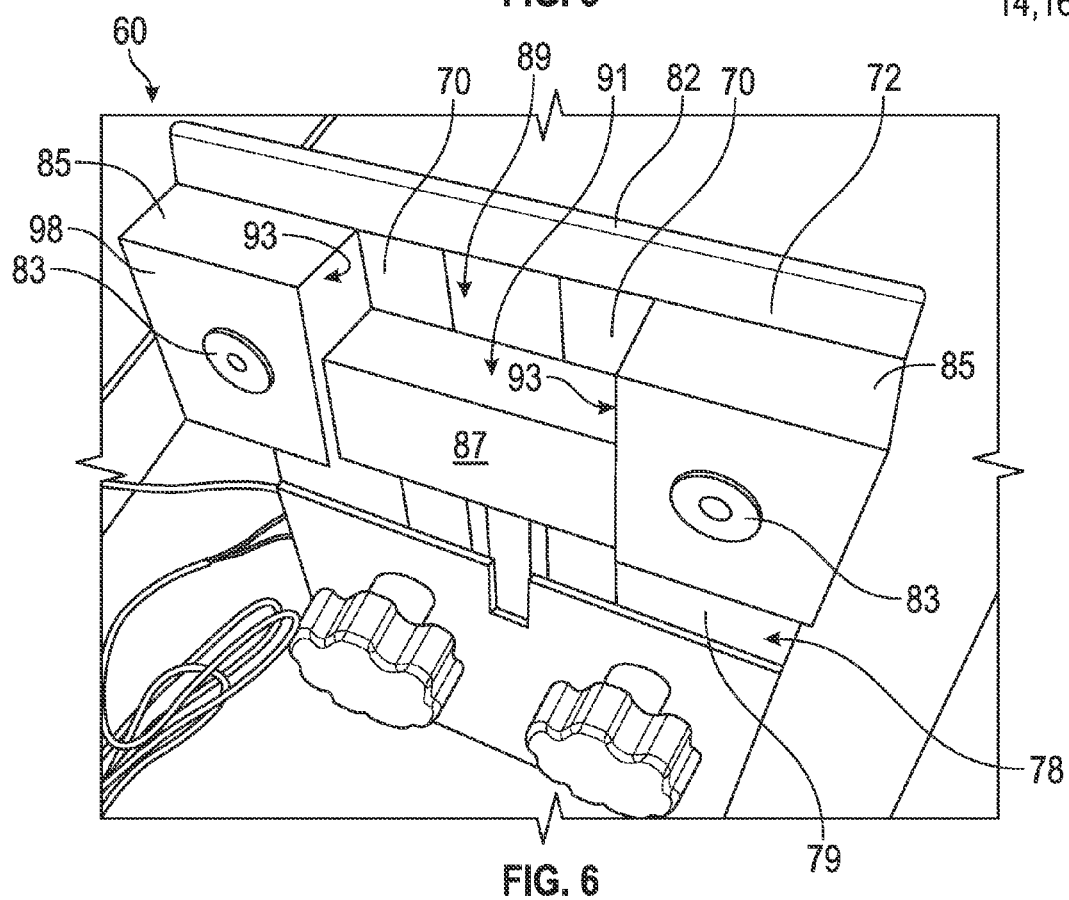
FIG. 6 is a schematic perspective side view of the check station of FIG. 4 including a guide member.

Referring now to FIG. 6, the check fixture 60 may include a guide member 98 configured to assist with guiding the welder device 129 (FIG. 1) into alignment with the check fixture 60 such that the welding horn 14 and welding anvil 16 are on opposite sides 72, 74 of the base member 68 during a manual alignment, i.e., without the use of the robot 50 (FIG. 3). The guide member 98 may be attached to the first side 72 of the base member 68 via one or more fasteners 83 and the like. Alternatively, the guide member may be attached to the second side 74 of the base member 68. The guide member 98 include a pair of bookends 85 disposed in spaced relationship to one another and a beam 87 operatively interconnecting the pair of bookends 85. The bookends 85 and the beam 87 cooperate to define an insertion channel 89 therebetween. The beam 87 presents a first support surface 91 facing the channel 89 and the bookends 85 each present a second support surface 93, each also facing the channel 89. The first and second surfaces 91, 93 cooperate to essentially provide a datum surface to guide the horn 14 and/or anvil into alignment with the plates 70 of the check fixture 60.

An example embodiment of the method 100 will now be described with reference to FIG. 7. Commencing at step 102, welding proceeds in the typical manner. For instance, when manufacturing multi-cell batteries of the type shown in FIG. 2, the conveyor 32 of FIG. 3 may move the work pieces 30 into place in front of the robot 50 shown in the same Figure. The welding horn 14 and the welding anvil 16 of FIG. 1 clamp onto the work piece 30 and form the required welds. During step 102, any of the sensors 25 of FIG. 1 positioned on the vibration welding equipment 10 continue to measure their respective data, including for instance the sensors 25C-25H of FIG. 3, which would be transmitted to the host device 40 (arrow C). As step 102 is ongoing, the method 100 proceeds to step 104.

At step 104, the host device 40 may reference a timer, or alternatively a counter, in order to determine if a calibrated amount of time or a calibrated number of welding cycles has occurred. In some embodiments, step 104 may be triggered manually, e.g., by an operator at the beginning or end of a shift. If the host device 40 determines that a predetermined/calibrated number or welding cycles has occurred, the method 100 proceeds to step 106. Otherwise, steps 102 and 104 are repeated.

Step 106 entails rotating the robot 50 (arrow R) of FIG. 3 toward the check station 54. As part of step 106, the conveyor 32 of the same Figure is temporarily stopped. The method 100 proceeds to step 108 when the robot 50 has moved the welding horn 14 and the welding anvil 16 into position at the check station 54.

At step 108, the host device 40 receives the signals described above with reference to FIG. 3. The signals measured at the check station 54 of FIG. 3 include the individual clamp forces Fc, as described above. As the measurements are being taken, the method 100 proceeds to step 110.

Step 110 entails determining if all required clamp force Fc values have been measured by the individual force sensors 25B. If not, step 108 is repeated. The method 100 proceeds to step 112 once all required measurements have been taken.

At step 112, the host device 40 adds all recorded values for the individual force sensors Fc together to determine a total clamp force Ft and to determine if the value of the total clamp force Ft falls outside of the band defined by these thresholds. In this manner, the host device 40 determines a condition of the welding equipment 10 as a function of the collective signal B from the sensors 25B.

The method may then proceed to optional step 114, where the host device 40 subtracts the recorded values of the individual clamp forces Fc from one another to determine whether the difference is beyond the defined threshold.

Appropriate corrective actions may be taken as part of steps 112 and/or 114 in the event that the values are determined to be outside of their allowable limits. The method 100 then returns to step 102, with the host device 40 commanding the robot 50 to rotate (arrow R) back toward the conveyor 32 and resume welding operations.

While the best modes for carrying out the disclosure have been described in detail, those familiar with the art to which this disclosure relates will recognize various alternative designs and embodiments for practicing the disclosure within the scope of the appended claims.

The invention claimed is:

1. A check fixture for measuring a total clamp force applied by a welder device having a welding horn and a welding anvil with the welding horn and welding anvil being movable between an unclamped position and a clamped position, the check fixture comprising:
    a base member having a first side and a second side, opposing the first side; and
    a plurality of force sensors operatively supported by the base member;
    wherein the base member and the plurality of force sensors are configured to be received between the welding horn and the welding anvil with the welding horn facing the first side and the welding anvil facing the second side; and
    wherein each of the plurality of force sensors is configured to measure an individual clamp force applied thereto by the welding horn and welding anvil when the base member is received between the welding horn and the welding anvil and the welder device is in the clamped position.

2. The check fixture, as set forth in claim 1, wherein the base member defines a plurality of openings extending between the first side and the second side; and
    wherein each of the plurality of force sensors is disposed in a respective one of the plurality of openings such that the base member operatively supports the plurality of force sensors.

3. The check fixture, as set forth in claim 2, further comprising a plurality of plates operatively attached to the first and second sides of the base member such that each of the plurality of force sensors is sandwiched between a corresponding pair of the plurality of plates operatively attached to the first and second sides;
    wherein the base member, the plurality of plates, and the plurality of force sensors are configured to be received between the welding horn and the welding anvil such that the welding pads of the welding horn face the plurality of plates operatively attached to the first side and with the anvil plates of the welding anvil face the plurality of plates operatively attached to the second side such that each of the plurality of force sensors is configured to measure an individual clamp force applied to the respective pair of the plurality of plates by the respective weld and anvil pads when the welder device is in the clamped position.

4. The check fixture, as set forth in claim 3, wherein each of the plurality of plates is attached to the base member at a respective fastening location, spaced a distance from a center of the respective opening; and
    wherein the distance is configured such that each of the plurality of plates is cantilevered at the respective fastening location and each of the plurality of force sensors is configured to measure an individual clamp force applied thereto by the respective pair of the plurality of plates, via the welding horn and welding anvil, when the base member, the plurality of plates, and the plurality of force sensors are received between the welding horn and welding anvil and the welder device is in the clamped position.

5. The check fixture, as set forth in claim 4, wherein each of the plurality of force sensors has a size configured such that each of the plurality of force sensors are in contact relationship with the respective pair of the plurality of plates to measure an individual clamp force applied thereto by the respective pair of the plurality of plates, via the welding horn and welding anvil, when the base member, the plurality of plates, and the plurality of force sensors are received between the welding horn and welding anvil and the welder device is in the clamped position.

6. The check fixture, as set forth in claim 5, wherein the first and second sides each define a recess extending to a floor;
    wherein a span is defined between the floors of the opposing first and second sides;
    wherein each of the plurality of force sensors is sized to have a length that is larger than the span;
    wherein the pairs of the plurality of plates are operatively disposed in the recess corresponding to the respective first and second sides of the base member such that the plurality of plates cover the respective openings and are in contact relationship with the respective one of the plurality of force sensors to measure an individual clamp force applied thereto by the respective pair of the plurality of plates, via the welding horn and welding anvil, when the base member, the plurality of plates, and the plurality of force sensors are received between the welding horn and welding anvil and the welder device is in the clamped position.

7. The check fixture, as set forth in claim 3, further comprising a host device in operative communication with each of the plurality of force sensors;
wherein the host device includes a processor configured to:
receive the individual clamp forces from each of the plurality of force sensors applied thereto by the welding horn and welding anvil when the base member is received between the welding horn and the welding anvil and the welder device is in the clamped position; and
determine the total clamp force for the weld tool by totaling the individual clamp forces for each of the plurality of force sensors.

8. A vibration welding system comprising:
a welder device, including a welding horn and a welding anvil, that is configured to apply a total clamp force and form a weld on a work piece clamped between the welding horn and the welding anvil;
wherein the welding horn includes a plurality of weld pads and the welding anvil includes a plurality of anvil pads disposed in facing relationship to the plurality of weld pads;
a check fixture configured to measure the total clamp force applied by the welder device, the check fixture comprising:
a base member having a first side and a second side, opposing the first side; and
a plurality of force sensors operatively supported by the base member;
wherein the base member and the plurality of force sensors are configured to be received between the weld pads of the welding horn and the anvil pads of the welding anvil with the welding horn facing the first side and the welding anvil facing the second side such that each of the plurality of weld pads and each of the plurality of anvil pads are facing a respective one of the plurality of force sensors; and
wherein each of the plurality of force sensors is configured to measure an individual clamp force applied thereto by the respective weld pad of the welding horn and the respective anvil pad of the welding anvil when the base member is received between the welding horn and the welding anvil and the welder device is clamped.

9. The vibration welding system, as set forth in claim 8, wherein the base member defines a plurality of openings extending between the first side and the second side; and
wherein each of the plurality of force sensors is disposed in a respective one of the plurality of openings such that the base member operatively supports the plurality of force sensors.

10. The vibration welding system, as set forth in claim 9, further comprising a plurality of plates operatively attached to the first and second sides of the base member such that each of the plurality of force sensors is sandwiched between a corresponding pair of the plurality of plates operatively attached to the first and second sides;
wherein the base member, the plurality of plates, and the plurality of force sensors are configured to be received between the welding horn and the welding anvil such that the welding pads of the welding horn face the plurality of plates operatively attached to the first side and with the anvil plates of the welding anvil face the plurality of plates operatively attached to the second side such that each of the plurality of force sensors is configured to measure an individual clamp force applied to the respective pair of the plurality of plates by the respective weld and anvil pads when the welder device is in the clamped position.

11. The vibration welding system, as set forth in claim 10, wherein each of the plurality of plates is attached to the base member at a respective fastening location, spaced a distance from a center of the respective opening; and
wherein the distance is configured such that each of the plurality of plates is cantilevered at the respective fastening location and each of the plurality of force sensors is configured to measure an individual clamp force applied thereto by the respective pair of the plurality of plates, via the welding horn and welding anvil, when the base member, the plurality of plates, and the plurality of force sensors are received between the welding horn and welding anvil and the welder device is in the clamped position.

12. The vibration welding system, as set forth in claim 11, wherein each of the plurality of force sensors has a size configured such that each of the plurality of force sensors are in contact relationship with the respective pair of the plurality of plates to measure an individual clamp force applied thereto by the respective pair of the plurality of plates, via the welding horn and welding anvil, when the base member, the plurality of plates, and the plurality of force sensors are received between the welding horn and welding anvil and the welder device is in the clamped position.

13. The vibration welding system, as set forth in claim 12, wherein the first and second sides each define a recess extending to a floor;
wherein a span is defined between the floors of the opposing first and second sides;
wherein each of the plurality of force sensors is sized to have a length that is larger than the span;
wherein the pairs of the plurality of plates are operatively disposed in the recess corresponding to the respective first and second sides of the base member such that the plurality of plates cover the respective openings and are in contact relationship with the respective one of the plurality of force sensors to measure an individual clamp force applied thereto by the respective pair of the plurality of plates, via the welding horn and welding anvil, when the base member, the plurality of plates, and the plurality of force sensors are received between the welding horn and welding anvil and the welder device is in the clamped position.

14. The vibration welding system, as set forth in claim 10, further comprising a host device in operative communication with each of the plurality of force sensors;
wherein the host device includes a processor and tangible, non-transitory memory on which is recorded instructions for monitoring the vibration welding equipment to determine the total clamp force applied by the weld and anvil pads;
wherein the host device is configured to execute the instructions from the memory, via the processor, to thereby:
receive a signal from each of the plurality of force sensors corresponding to the base member being received between the weld pads of the welding horn and the anvil pads of the welding anvil and the welder device being clamped; and process the plurality of signals to determine an individual clamp force corresponding to each of the plurality of force sensors.

15. The vibration welding system, as set forth in claim 14, wherein the host device is further configured to execute the instructions from the memory, via the processor, to thereby:
    determine a total clamp force by totaling the plurality of individual clamp forces corresponding to each of the plurality of force sensors.

16. A method for determining a status of a welder device, wherein the welder device includes a welding horn having a plurality of weld pads and a welding anvil having a plurality of anvil pads, the method comprising:
    clamping a plurality of force sensors between a respective weld pad of the welding anvil and a respective anvil pad of the welding horn;
    transmitting a force signal from each of the plurality of force sensors to a processor, wherein each of the plurality of force signals corresponds to a respective one of the force sensors being clamped between the respective weld pad of the welding horn and the respective anvil pad of the welding anvil;
    receiving the plurality of force signals from each of the force sensors in the processor; and
    processing the plurality of force signals in the processor to determine an individual clamp force corresponding to each of the plurality of force sensors to thereby determine a status condition of the weld and anvil pads of the vibration welding equipment.

17. A method, as set forth in claim 16, further comprising:
    determining, in the processor, a total clamp force applied to the plurality of force sensors by the plurality of weld and anvil pads by totaling the plurality of individual clamp forces corresponding to each of the plurality of force sensors; and
    determining the total clamp force is not within an acceptable range.

18. A method, as set forth in claim 17, further comprising outputting an indication that the total clamp force applied by the weld pads of the welding horn and the weld pads of the welding anvil is not within the acceptable range.

19. A method, as set forth in claim 16, further comprising:
    determining a relative difference between at least two of the plurality of individual clamp forces;
    determining the relative difference between the at least two of the plurality of individual clamp forces is not within an acceptable range.

20. A method, as set forth in claim 19, further comprising outputting an indication that the relative difference between the at least two of the plurality of individual clamp forces is not within the acceptable range.

\* \* \* \* \*